United States Patent

Herger et al.

[15] 3,645,464

[45] Feb. 29, 1972

[54] REEL LATCH

[72] Inventors: Zoltan Herger, Northglenn; Paul O. Pearson, Longmont, both of Colo.

[73] Assignee: Storage Technology Corporation, Boulder, Colo.

[22] Filed: Apr. 30, 1970

[21] Appl. No.: 33,371

[52] U.S. Cl. ....................242/68.3

[51] Int. Cl. ....................B65h 19/02

[58] Field of Search ....................242/68.3, 72, 72.1, 77.3, 76.4

[56] References Cited

UNITED STATES PATENTS

| | | | |
|---|---|---|---|
| 2,882,078 | 4/1959 | MacDonald | 242/68.3 X |
| 2,928,620 | 3/1960 | Stavrakis | 242/68.3 |
| 2,598,398 | 5/1952 | Littell | 242/72.1 |
| 3,545,695 | 12/1970 | Patton | 242/68.3 |

*Primary Examiner*—George F. Mautz
*Assistant Examiner*—Edward J. McCarthy
*Attorney*—Woodcock, Washburn, Kurtz & Mackiewicz

[57] ABSTRACT

A magnetic tape drive unit has an automatic latch for locking a magnetic tape reel to the shaft. When the reel is placed on the shaft, a sensor is actuated by proximity of the reel to its operating position. Pads on the shaft hub are driven into frictional engagement between the hub and the reel when the sensor is actuated. A solenoid actuator operates a combination of cone and cams which translate axial motion of the solenoid actuator into radial motion which drives the friction pads into engagement with the reel.

8 Claims, 4 Drawing Figures

REEL LATCH

BACKGROUND OF THE INVENTION

This invention relates to magnetic tape drive units and more particularly to an automatic latch for locking the tape reel on the shaft of the magnetic tape drive unit.

High performance magnetic tape drive units of the type commonly used with digital data processing equipment operate at extremely high tape speeds. Speeds of 200 inches per second and 500 inches per second are common. Because of the high acceleration and inertia loads, each magnetic tape reel must be securely clamped to the motor shaft. On the other hand, the reels must be easily placed on the shaft and removed from the shaft when the tape reels are changed.

In general, hand-operated mechanical-locking mechanisms have been employed to lock the reels on the drive unit shafts. Such mechanism require time to operate and are subject to failure of the operator to set the lock after placing the reel on the shaft.

SUMMARY OF THE INVENTION

In accordance with an important aspect of this invention a magnetic tape reel is automatically clamped securely by frictional engagement between its inside diameter and the hub of the shaft to provide a high antislipping force which prohibits relative motion between the reel and the hub.

In accordance with another aspect of the invention bistable spring-loaded clamps on the periphery of the hub exert a force on the reel to position it against the flange of the hub. This holds the reel against the flange until the automatic locking mechanism is actuated to securely fasten the reel to the hub.

In accordance with another aspect of this invention, a sensor is provided to sense when the reel is placed in proximity to its operating position. This sensor deenergizes a solenoid which operates the locking mechanism after a short delay. The delay is provided to allow the clamps to position the reel correctly before locking.

In accordance with another aspect of this invention the locking mechanism includes a cone and cams which convert motion of a solenoid actuator in a direction which is axial to the reel to a motion which is radial to the reel and which forces friction pads into engagement with the inside periphery of the reel.

In accordance with another aspect of this invention the reel latch is fail-safe because the cone-cam combination is normally biased to exert a clamping force on the reel. The solenoid actuator is energized only when the reel is removed from the shaft.

The foregoing and other important features will be more apparent from the following more detailed description.

DESCRIPTION OF A PARTICULAR EMBODIMENT

Referring to the Figures, the reel 10 is shown in position on the hub 11 of the motor shaft 12.

Figures 1, 2, 3:
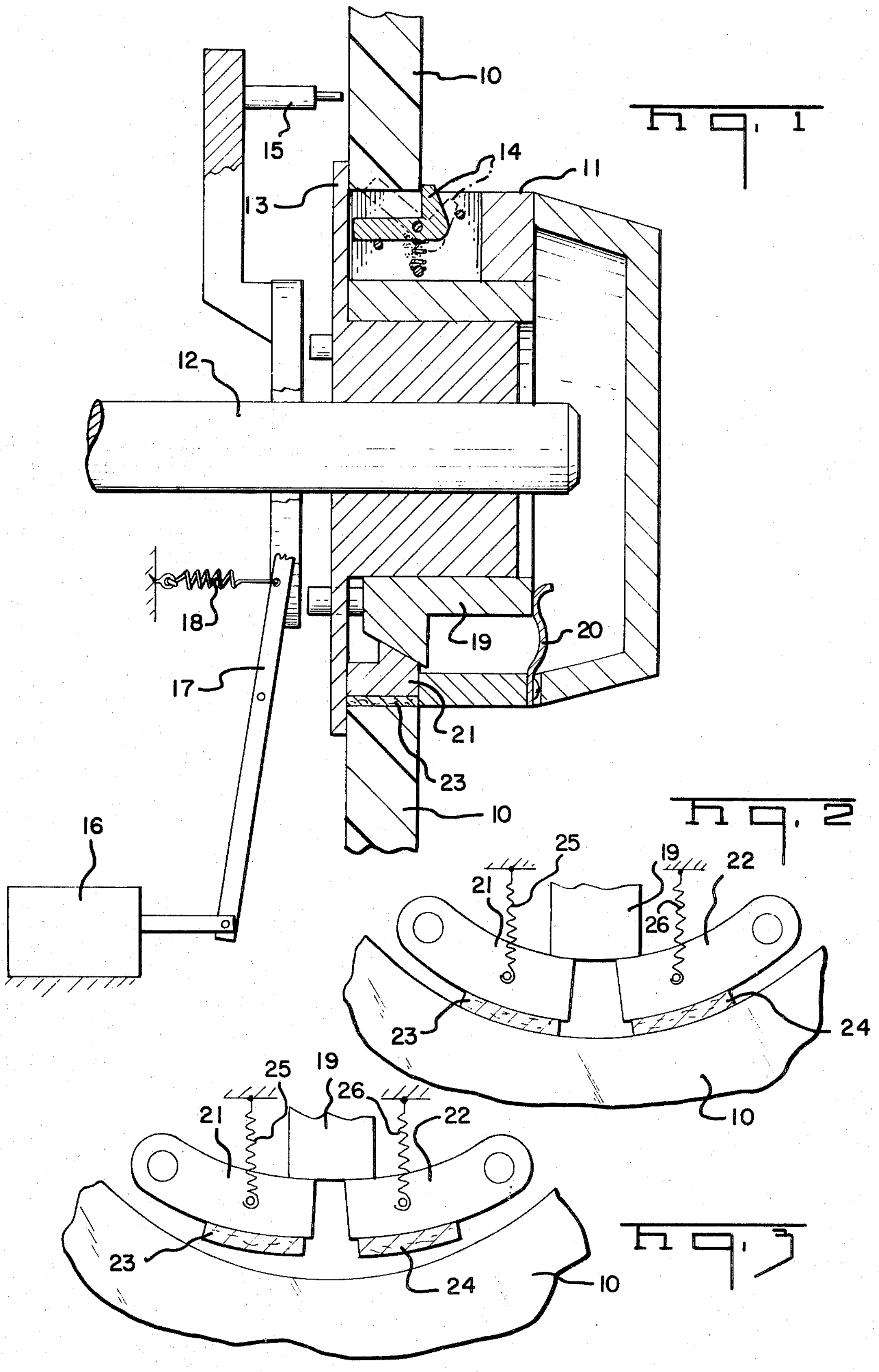
FIG. 1 is a cross section view through the shaft, hub and reel.
FIG. 2 shows one set of cams in the locked position.
FIG. 3 is the same view as FIG. 2 but with the cone and cams in their unlocked position.
Figure 4:
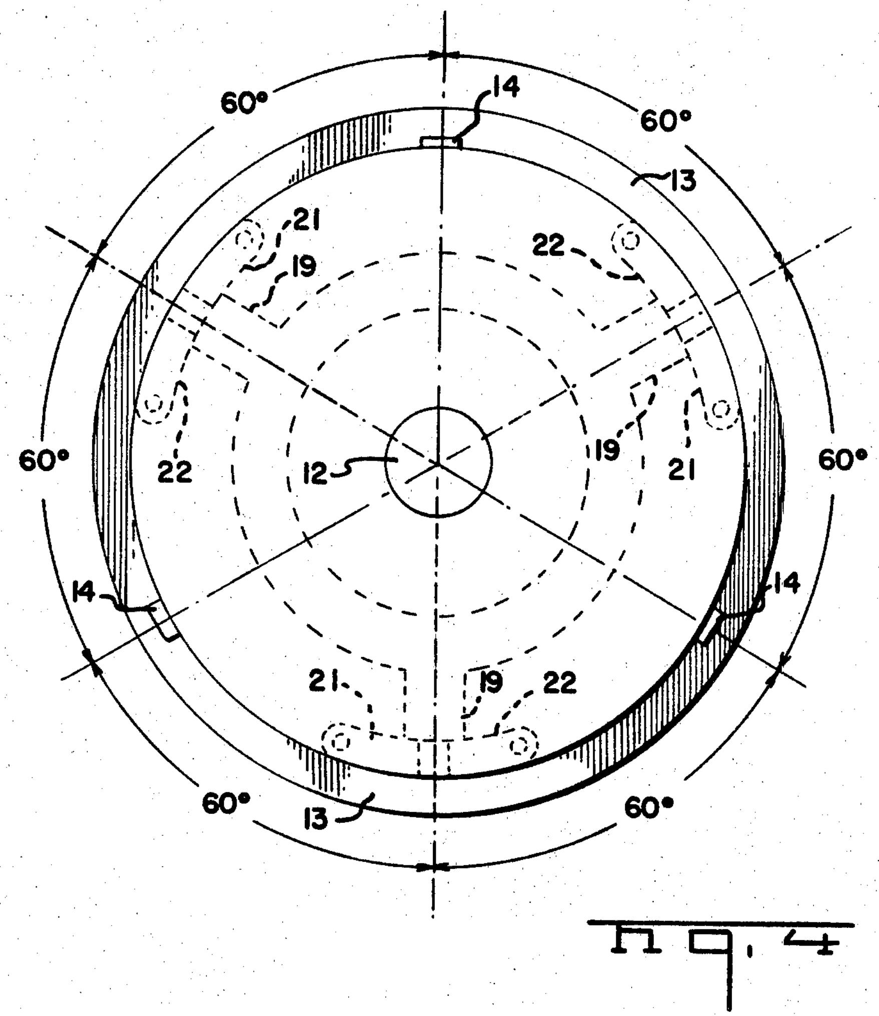
FIG. 4 is a diagrammatic plan view illustrating the relative arrangement of the elements of the device shown in FIGS. 1-3.

As the reel is placed in position on the hub, three bistable clamps urge the reel toward the flange 13 of the hub and to the operating position. Only one of the bistable clamps is shown in FIG. 1. It includes an overcenter finger 14 having a spring bias. The finger 14 rotates counterclockwise as the reel is placed in position over the hub. When the finger passes through the overcenter position, the spring bias exerts a force on the reel 10 to hold it in position against the hub flange 13.

Two microswitch sensors, (only the sensor 15 being shown) are spaced 180° apart on the magnetic tape drive unit. The sensors sense the proximity of the reel to its operating position on the tape drive unit. That is, when the reel is placed on the hub, the microswitch is actuated and this in turn triggers electrically operated means into frictional engagement between the shaft and the reel. Specifically, the electrically operated means includes a solenoid 16 which is deenergized when the microswitches are actuated. The solenoid actuator moves a lever 17 which is biased by the spring 18 to the position shown. (As shown, the solenoid 16 is deenergized). The microswitches are also moved away by the lever 17.

A cam means is provided for translating motion axial to said reel to motion radial to said reel. A camming member in the front of a cone 19 moves axially toward the flange by the force exerted by the cone spring 20. The beveled surface of the cone forces two spring-biased rotating cammed members, cams 21 and 22 with beveled surfaces, radially outwardly into frictional engagement with the reel. Each cam which is biased to the position shown in FIG. 3 by springs 25 and 26, is covered with a high friction pad, the pads 23 and 24 being shown. The cam 21 rotates clockwise and the cam 22 rotates counterclockwise opposing the force of the spring 25 and 26 as the cone 19 forces the cams into engagement with the inside surface of the reel 10. There are three sets of cams which cover the full 360° of the inside surface of the reel 10. The cams and their associated friction pads provide a self-locking action that prevents the reel from slipping on the hub in either direction.

Not shown in the drawing of FIG. 1 is the electrical delay between actuation of the microswitch 15 and deenergization of the solenoid 16. This delay insures that the reel 10 is properly positioned on the hub by the three bistable clamps before the reel is locked on the hub by the electrically operated solenoid and cam means including the cone 19 and the cam 21.

The wiring of the two microswitches to deenergize the solenoid after a short delay will be apparent to those skilled in this art. Also apparent will be the wiring which energizes the solenoid. In order to remove a reel from the hub, a hub release button is pressed on the control panel. This energizes the solenoid 16. The lever 17 moves the cone 19 in an axial direction away from the flange. This allows the springs 25 and 26 to rotate the cams 21 and 22 away from the inside surface of the reel. The cams and cone are shown in their unlocked position in FIG. 3 The reel can then be pulled off the hub by the operator. As the reel is removed the bistable clamps are set automatically. For example, the finger 14 moves clockwise through its overcenter position to the position at which it is cocked to accept another reel when the reel is placed on the hub.

While a particular embodiment has been shown and described, modifications may be made without departing from the true spirit and scope of the invention. The appended claims are therefore intended to cover such modifications.

What is claimed is:

1. An automatic latch for locking a magnetic tape reel to the shaft of a magnetic tape drive unit comprising:
   - means for sensing the proximity of said reel to its operating position on said tape drive unit,
   - frictional engagement means for locking said reel to said shaft upon actuation, and
   - electrically operated means responsive to said means for sensing when said reel is in said operating position to actuate said friction engagement means and lock said reel to said shaft.

2. The automatic latch recited in claim 1 wherein said shaft has a hub with at least one bistable spring-loaded clamp on the periphery thereof, said clamp being spring-loaded and having a first position for receiving said reel and a second position forcing said reel to the operating position on said hub.

3. The latch recited in claim 2 wherein there is a time delay between the sensing of the proximity of said reel by said means for sensing and the actuation of said electrically operating means so that said clamp positions said reel properly before said electrically operated means are actuated into frictional engagement.

4. The latch recited in claim 1 wherein said reel has an inside surface receiving said shaft;

said shaft has a hub including said frictional engagement means which comprises at least one friction pad for engaging the inside surface of said reel and a cam means having a camming member and a cammed member for translating motion axial to said reel to motion radial to said reel, said cammed means being positioned so that radial motion thereof forces said friction pad into engagement with the inside surface of said reel, and said electrically operated means comprises a solenoid actuator responsive to the output of said sensing means for movement of said camming means in an axial direction in accordance with the proximity of said reel to its operating position.

5. The latch recited in claim 4 wherein said cammed member includes a beveled surface and said camming member comprises a cone having a beveled surface engaging the beveled surface of said camming member to drive it radially when said cone is moving axially, a spring biasing said cone to a position which holds such cammed member in a position such that said friction pad engages the inside surface of said reel, said solenoid actuator having a deenergized position in which said cone moves said cam into engagement with said reel, said solenoid being deenergized by said sensing means when said reel is in its operating position.

6. The latch recited in claim 1 wherein said reel has an inside surface receiving said shaft and said shaft has a hub including said frictional engagement means which comprises:

a pair of cams each rotatable in opposite directions to frictional engagement with the inside surface of said reel, each cam having a beveled surface, a cone having a beveled surface engaging the beveled surfaces of said cams to drive them radially when said cone is moving axially, a cone spring urging said cone in an axial direction which forces said cams into frictional engagement with said reel, and said electrically operated means comprises a solenoid actuator driving said cone in a radial direction which releases the frictional engagement between said cams and said reel when said solenoid is energized.

7. The latch recited in claim 6 wherein said frictional engagement means further comprises at least one spring for biasing said cams to a position without frictional engagement with the inside surface of the reel when said solenoid actuator is deenergized.

8. A automatic latch for locking a magnetic tape reel to the shaft of a magnetic tape drive unit comprising;

means for sensing the presence of said reel on said shaft;

locking means for securing said reel to said shaft and preventing relative rotational movement therebetween; and means for actuating said locking means in response to said means for sensing the presence of said reel on said shaft.

* * * * *